July 3, 1928.
J. J. OGDEN
1,676,042
DENTIST'S FORCEPS
Filed July 29, 1926
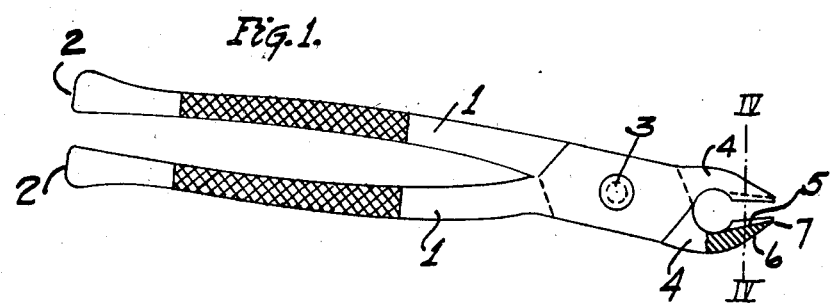
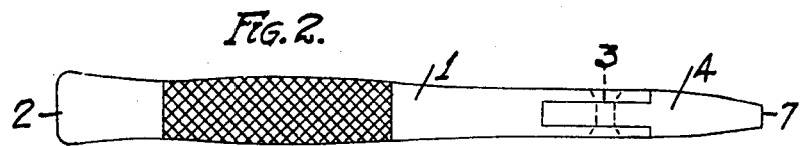
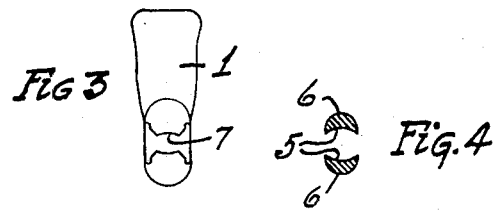
INVENTOR
John J. Ogden
By J. H. Weatherford
ATTORNEY.

Patented July 3, 1928.

1,676,042

UNITED STATES PATENT OFFICE.

JOHN J. OGDEN, OF MEMPHIS, TENNESSEE.

DENTIST'S FORCEPS.

Application filed July 29, 1926. Serial No. 125,699.

This invention relates to improvements in forceps especially adapted for use by dentists in the extraction of teeth. It has especial reference to the construction of the beak of the forceps, and of forceps designed for use with such a beak.

In extracting carious teeth where the crown is badly broken down, the present practice in removing the tooth, is to loosen the tooth by means of a chisel which is forced between the tooth and the gum and between the alveolar process and the tooth, in order primarily however to spread the alveolar process away from the tooth to give space for the beak of the forceps to enter. This operation is performed first on the buccal side and then on the lingual side either by forcing the chisel by hand or by driving the chisel in with a mallet. After loosening, the tooth is removed by a pair of forceps, such pair of forceps, of course, being selected, as may most nearly conform to the shape and size of the tooth to be removed. It results however, that, while the tooth may be loosened in the socket by the chisel, the space opened up will immediately close unless the alveolar process be broken down, which is only permissible with molars, or back teeth, so that ordinarily no opening remains into which the ends of the forceps may enter, and that the forceps must engage the tooth outside the alveolar process whereby often an unsound portion is grasped producing a fracture of the tooth.

The result is accentuated by the shape of the present forcep beaks, which are comparatively blunt and in addition are longitudinally curved so that entrance of the beak point between the alveolar process and the tooth root is not possible. Likewise in removing anterior teeth where it is essential for esthetic reasons, that the alveolar process be not destroyed, a chisel may only be used for loosening the gum from the tooth. In such case the present curved beaks often bruise or even pinch off a portion of the gum and fail to get a grasp on the tooth even against the alveolar process, much less within the same.

The objects of my invention, are, (a) To make beaks for forceps which will serve both as chisel and beak;

(b) To make beaks for forceps which may open, and retain for use, any opening between process and tooth, and (c) To make forceps designed to make use of such beaks.

In carrying out these objects I make a chisel beak which is wedge-shaped in longitudinal section, concave in cross section and has a knife edge, preferably tempered so that it will hold its edge.

I further accomplish these objects by forming a concave chisel beak on forceps having blunt-end handles, whereby the ends of same may be struck with a mallet to drive the chisel points into place between the alveolar process and the tooth.

The manner in which this is accomplished will be more fully hereinafter set out in the specification and in the drawings, in which,—

Fig. 1 is a side view of a pair of forceps with one chisel beak shown in longitudinal section.

Fig. 2 is a plan view of the forceps.

Fig. 3 is an end view looking from right to left in Fig. 1, and

Fig. 4 is a cross section on the line IV—IV of Fig. 1.

Referring now to the drawings in which the various parts are indicated by numerals, 1—1 are the forcep handles having blunt ends 2, so designed as to permit being struck by a hammer or mallet if it be so desired. 3 is the usual type of pivot pin, and 4 are the beaks or jaws. Each of these jaws has an inner surface 5 which is substantially straight longitudinally and a similar outer surface 6 which meet in a knife edge 7. This knife edge 7 as shown in Fig. 3 is preferably concaved to conform more or less to the cross section of a tooth.

By reference to Fig. 4 it will be seen that the inner surface 5 is similarly concaved and that the outer surface 6 is convexed. The points 7 of the beaks are preferably tempered or otherwise hardened so that they may be sharpened to a knife edge, and retain such edge.

In using the forceps the chisel-shaped beaks of the forceps are placed on the tooth to be extracted and pushed along the tooth, loosening the gum, until the chisel points reach the alveolar process. If the tooth is an anterior tooth and it be possible to do so, the chisel points are simply pushed firmly into place slightly within the process, the forceps are clamped by the hand in the usual manner and the tooth withdrawn. Should it be necessary, on account of the condition of the tooth, the chisel points may be driven in between the tooth and process to loosen the tooth therefrom and the tooth then be extracted. Where molars are to be extracted the same procedure is followed except that in such case, ordinarily, the chisel points are driven in between the process and the tooth, thoroughly loosening the tooth therefrom, and even in many cases breaking down a small part of the buccal portion of the process.

It will be seen that by incorporating the chisel point into the beak of the forceps it is possible to always cleanly separate the gum from the tooth thereby preventing bruising the gum and also that it is possible to loosen the alveolar process from the tooth and to force the points of the beaks far enough within the process to enable a sound portion of the tooth to be grasped and the tooth root to be removed.

It will further be seen, that the space opened up between the process and the tooth is retained and made available to enable the beaks of the forceps to secure a better hold, on what is ordinarily a sound portion of an otherwise badly decayed tooth.

It will of course be understood that the drawings herewith illustrate only one of a series of forceps which ordinarily comprise a set, and that various modifications may be made in size and pattern of the beaks. It will therefore be understood that the drawings are illustrative only and that I do not intend to limit myself thereby except as may be hereinafter specified in the claims.

Having fully described my invention, what I claim is:—

1. In dental forceps, a beak terminating in a member tapered along longitudinally straight lines, said member having a concave inner surface, and a convex outer surface, said surfaces terminating jointly in a knife edge at right angles to said longitudinal lines.

2. Dental forceps having oppositely disposed beaks, each of said beaks having a knife-edge end and enlarging rearwardly from said end along substantially straight lines, the inner surfaces of said beaks diverging to a minor extent only, along straight lines from said edges.

3. Dental forceps having oppositely disposed beaks, each of said beaks being concavo-convex in cross section, having a knife-edged end and enlarging rearwardly from said end along substantially straight lines, the inner surfaces of said beaks diverging to a minor extent only, along straight lines from said edges.

4. Dental forceps, having jaws with their inner surfaces lying along substantially straight longitudinal lines, their end edges sharpened to a knife edge and their outer surfaces diverging from said inner surfaces along substantially straight lines, whereby beaks are formed adaptable to be inserted between a tooth and oppositely disposed portions of the alveolar process, and to grip and withdraw said tooth.

5. Dental forceps, having jaws with their inner surfaces concaved in cross section and lying along substantially straight longitudinal lines, their end edges sharpened to a knife edge and their outer surfaces diverging from said inner surfaces along substantially straight lines, whereby beaks are formed adaptable to be inserted between a tooth and oppositely disposed portions of the alveolar process and to grip and withdraw said tooth.

6. Dental forceps, having jaws laterally converging toward their outer ends with their inner surfaces lying along substantially straight longitudinal lines, their ends sharpened to a knife-edge and their outer surfaces diverging from said inner surfaces along substantially straight lines, whereby beaks are formed adaptable to be inserted between a tooth and portions of the surrounding alveolar process, and to grip and withdraw said tooth.

In testimony of the foregoing, I affix my signature.

JOHN J. OGDEN.